(12) United States Patent
Konchan et al.

(10) Patent No.: US 9,707,889 B2
(45) Date of Patent: Jul. 18, 2017

(54) METHOD OF CONTROLLING A VEHICLE DOOR LOCK SYSTEM

(71) Applicant: GM GLOBAL TECHNOLOGY OPERATIONS LLC, Detroit, MI (US)

(72) Inventors: Jeffrey L. Konchan, Romeo, MI (US); William A. Biondo, Beverly Hills, MI (US); David T. Proefke, Troy, MI (US); Frank J. Arabia, Jr., Macomb, MI (US); Thomas E. Utter, Royal Oak, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 141 days.

(21) Appl. No.: 14/729,616

(22) Filed: Jun. 3, 2015

(65) Prior Publication Data

US 2016/0355128 A1 Dec. 8, 2016

(51) Int. Cl.
| | |
|---|---|
| *B60Q 9/00* | (2006.01) |
| *E05B 81/76* | (2014.01) |
| *E05B 81/70* | (2014.01) |
| *E05B 81/72* | (2014.01) |
| *B60R 25/10* | (2013.01) |

(52) U.S. Cl.
CPC .............. *B60Q 9/00* (2013.01); *E05B 81/70* (2013.01); *E05B 81/72* (2013.01); *E05B 81/76* (2013.01); *B60R 2025/1016* (2013.01)

(58) Field of Classification Search
None
See application file for complete search history.

(56) References Cited

U.S. PATENT DOCUMENTS

| | | | | |
|---|---|---|---|---|
| 3,852,614 | A * | 12/1974 | Carlson | B60R 25/04 180/286 |
| 5,396,158 | A * | 3/1995 | Long | E05F 15/646 318/266 |
| 5,451,926 | A * | 9/1995 | Li | B60R 25/104 180/287 |
| 5,574,315 | A * | 11/1996 | Weber | B60J 7/0573 180/271 |
| 6,570,495 | B1 * | 5/2003 | Lavelle | H04B 1/082 340/425.5 |
| 6,922,622 | B2 * | 7/2005 | Dulin | B06B 1/0215 180/272 |
| 7,129,597 | B2 * | 10/2006 | Proefke | B60R 25/24 180/289 |

(Continued)

*Primary Examiner* — Jerrah Edwards
*Assistant Examiner* — Donald J Wallace
(74) *Attorney, Agent, or Firm* — Quinn IP Law

(57) ABSTRACT

A method of controlling a vehicle includes sensing movement of an interior door handle of the vehicle with a sensing device, such as a door lock switch. A position of a door of the vehicle is sensed with a door position sensor, after movement of the interior door handle is sensed, to determine if the door remains in an unopened position after movement of the interior door handle is sensed, or if the door moves into an opened position after movement of the interior door handle is sensed. When movement of the interior door handle is sensed and the door remains in the unopened position after movement of the interior door handle, instructions are provided with an audio or video device related to the proper procedure for unlocking and opening the door.

18 Claims, 2 Drawing Sheets

(56) References Cited

U.S. PATENT DOCUMENTS

| | | | | |
|---|---|---|---|---|
| 7,352,081 B2* | 4/2008 | Taurasi | B60R 25/00 | 180/272 |
| 7,684,915 B1* | 3/2010 | Dailey | A61G 3/061 | 414/462 |
| 2002/0021010 A1* | 2/2002 | Hirota | E05B 77/48 | 292/201 |
| 2002/0080014 A1* | 6/2002 | McCarthy | B60N 2/002 | 340/426.1 |
| 2003/0122426 A1* | 7/2003 | Aiyama | E05B 41/00 | 307/10.1 |
| 2003/0171864 A1* | 9/2003 | Mushiake | E05B 81/58 | 701/45 |
| 2003/0182863 A1* | 10/2003 | Mejean | E05B 81/70 | 49/26 |
| 2004/0203696 A1* | 10/2004 | Jijina | G01C 21/26 | 455/420 |
| 2005/0074131 A1* | 4/2005 | McCall | H04R 5/02 | 381/86 |
| 2007/0210588 A1* | 9/2007 | Cetnar | E05B 77/26 | 292/216 |
| 2009/0160211 A1* | 6/2009 | Krishnan | B60J 5/04 | 296/146.4 |
| 2009/0287379 A1* | 11/2009 | Lange | E05B 81/14 | 701/49 |
| 2010/0057308 A1* | 3/2010 | Hill | B60R 21/0132 | 701/51 |
| 2010/0235059 A1* | 9/2010 | Krishnan | E05B 81/14 | 701/49 |
| 2011/0154740 A1* | 6/2011 | Matsumoto | E05B 79/20 | 49/359 |
| 2013/0207773 A1* | 8/2013 | Hathaway | B60K 28/12 | 340/3.43 |
| 2014/0001778 A1* | 1/2014 | Yokomori | E05B 85/10 | 292/336.3 |
| 2014/0136187 A1* | 5/2014 | Wolverton | G06F 17/30654 | 704/9 |
| 2015/0210289 A1* | 7/2015 | Eichin | B60W 50/0205 | 701/49 |

* cited by examiner

METHOD OF CONTROLLING A VEHICLE DOOR LOCK SYSTEM

TECHNICAL FIELD

The disclosure generally relates to a method of controlling a vehicle, and more specifically, to a method of controlling a door lock system of a vehicle.

BACKGROUND

Doors of vehicles include a door latch to secure the door to the body of the vehicle, and a door lock system to lock the door latch, and prevent the door from being opened from an exterior of the vehicle. When the door lock system is disposed in a locked state, the door may be opened from the interior of the vehicle by operating an interior door handle. Some vehicles require that the interior door handle be actuated twice to open the door when the door lock system is disposed in the locked state. For example, some vehicles require that the interior door handle be actuated a first time, which unlocks the door lock system, but does not un-latch the door latch. The interior door handle may then be actuated a second time to un-latch the door latch, and open the door. In some vehicles, the door lock system may be equipped with a double door lock feature. When activated, the double door lock feature prevents the door lock system from being unlocked and opened with either an exterior door handle or the interior door handle. Typically, the double door lock feature may only be inactivated or released by a remote, electronic keyless entry device, or by an electronic signal from a vehicle lock controller.

SUMMARY

A method of controlling a vehicle is provided. The method includes sensing movement of an interior door handle of the vehicle with a sensing device. A position of a door of the vehicle is sensed with a door position sensor, after movement of the interior door handle is sensed. The position of the door is sensed to determine if the door remains in an unopened position after movement of the interior door handle is sensed, or if the door moves into an opened position after movement of the interior door handle is sensed. When movement of the interior door handle is sensed and the door remains in the unopened position after movement of the interior door handle, instructions are provided with an audio or video device related to the proper procedure for unlocking and opening the door.

A method of controlling a door lock system of a vehicle is also provided. The method includes sensing a current status of the door lock system with a lock switch, to determine if the door lock system is disposed in a locked state or if the door lock system is disposed in an unlocked state. Movement of an interior door handle of the door is sensed with a sensing device. When movement of the interior door handle is sensed, an opening timer is started to measure a time period. A position of the door of the vehicle is sensed with a door position sensor, after movement of the interior door handle is sensed. The position of the door is sensed to determine if the door remains in an unopened position after movement of the interior door handle is sensed, or if the door moves into an opened position after movement of the interior door handle is sensed. When the door remains in the unopened position after movement of the interior door handle is sensed, the measured time period is compared to a maximum delay time, with a vehicle lock controller. The measured time period is compared to the maximum delay time to determine if the measured time period is equal to or greater than the maximum delay time, or if the measured time period is less than the maximum delay time. When movement of the interior door handle is sensed, the door remains in the unopened position after movement of the interior door handle, and the measured time period is equal to or greater than the maximum delay time, instructions are provided with an audio or video device. The instructions are related to the proper procedure for unlocking and opening the door.

Accordingly, if an occupant actuates an interior door handle to open the door of the vehicle, when the door lock system is locked, and the door remains closed after the interior handle has been actuated, then the vehicle provides an audio and/or visual message providing instructions on how to unlock and/or open the door, thereby allowing the occupant to exit the vehicle.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Figure 1:
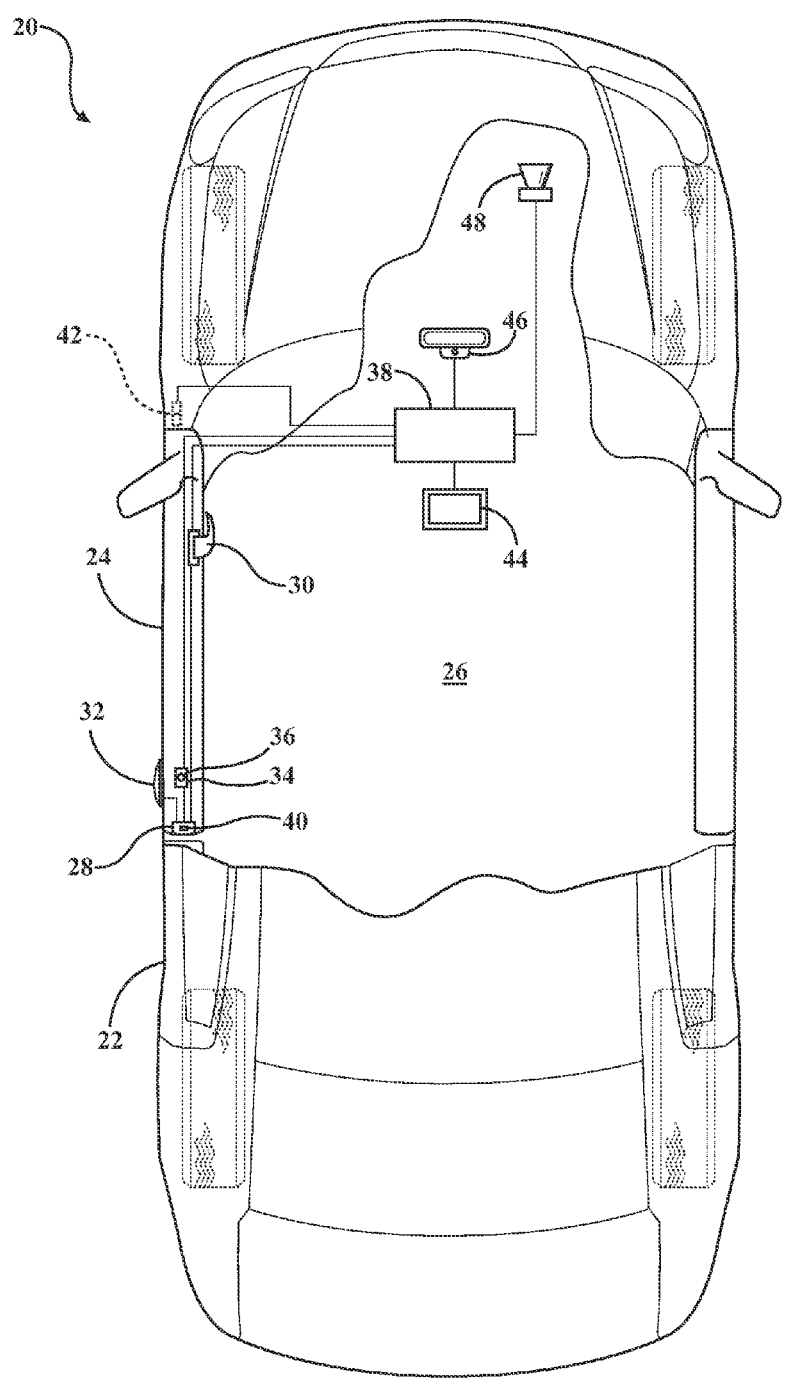
FIG. 1 is a schematic plan view of a vehicle.

Referring to the Figures, wherein like numerals indicate like parts throughout the several views, a vehicle is generally shown at 20 in FIG. 1. Referring to FIG. 1, the vehicle 20 includes a body 22, and at least one door 24 that provides ingress/egress into an interior passenger compartment 26 of the vehicle 20. The door 24 includes a latch 28 that is operable to secure the door 24 relative to the body 22, to prevent the door 24 from moving out of a closed position as is known in the art. When the latch 28 is engaged and the door 24 is secured by the latch 28, the door 24 is secured relative to the body 22 in a closed position. When the latch 28 is disengaged, i.e., when the door 24 is unlatched, the door 24 is free to move between the closed position and an open position. The latch 28 may include any suitable style and/or configuration of latch 28 known to those skilled in the art. For example, the latch 28 may include a fork bolt (not shown) supported by the door 24, that is rotatable to engage a striker (not shown) that is supported by the body 22. The latch 28 may be actuated by either an interior door handle 30, or an exterior door handle 32, as is known in the art.

The door 24 further includes a door lock system 34. The door lock system 34 is operable to lock the latch 28 of the door 24, to prevent the latch 28 from being moved from the engaged position into the disengaged position. The door lock system 34 may include any suitable style and/or configuration of lock capable of locking the latch 28 of the door 24. The door lock system 34 is moveable between a locked state, and an unlocked state. When disposed in the locked state, the door lock system 34 locks the latch 28, and prevents the latch 28 from being disengaged. When disposed in the unlocked state, the door lock system 34 does not interfere with the latch 28, and allows the latch 28 to be manipulated between the engaged state and the disengaged state.

The door lock system 34 may further include a double door lock feature 36. The double door lock feature 36 operates as is known in the art to lock the door lock system 34, and prevent actuation of the latch 28 by either the interior door handle 30 or the exterior door handle 32. The double door lock feature 36 may include any device capable of mechanically locking the door lock system 34 in the locked state, and preventing either the interior door handle 30 or the exterior door handle 32 from actuating the latch 28. When the double door lock feature 36 is active, the double door lock feature 36 prevents the door lock system 34 from moving from the locked state into the unlocked state, thereby preventing either the interior door handle 30 or the exterior door handle 32 from actuating the latch 28. Typically, the double door lock system 34 is controlled via a control signal from a vehicle lock controller 38. The vehicle lock controller 38 may send the control signal when signaled by a remote keyless entry device. Alternatively, the vehicle lock controller 38 may send the control signal to inactivate the double door lock feature 36 in response to a signal from a remote service provider.

The vehicle 20 may further include a lock switch 40 coupled to the door lock system 34. The lock switch 40 is operable to sense the state of the door lock system 34, i.e., the locked state or the unlocked state, and move the door lock system 34 between the locked state and the unlocked state. The lock switch 40 may include any type and/or style of switch suitable for use with the door lock system 34, and capable of moving the door lock system 34 between the locked state and the unlocked state. The lock switch 40 is in electronic communication with the vehicle lock controller 38. The vehicle lock controller 38 is operable to send and receive control signals with and between the lock switch 40 to determine the state of the door lock system 34, and control the state of the door lock system 34.

The vehicle 20 may further include a door position sensor 42 that is operable to sense a position of the door, i.e., the unopened or closed position or the opened position. The door position sensor 42 may include any suitable type of sensor that is capable of sensing the position of the door 24, i.e., sensing whether the door 24 is in the closed position, or is in the open positon. The door position sensor 42 may also be operable to sense continuous movement of the door 24 relative to the body 22. The door position sensor 42 is in electronic communication with the vehicle lock controller 38. The vehicle lock controller 38 is operable to send and receive signals with and between the door position sensor 42 to determine and/or identify the current position of the door 24.

The vehicle lock controller 38 is operable to control the door lock system 34, including the double door lock feature 36. The vehicle lock controller 38 may include a computer and/or processor, and include all software, hardware, memory, algorithms, connections, sensors, etc., necessary to manage and control the operation of the door lock system 34 and the double door lock feature 36. As such, a method, described below and generally shown in FIG. 2, may be embodied as a program operable on the vehicle lock controller 38. It should be appreciated that the vehicle lock controller 38 may include any device capable of analyzing data from various sensors and/or switches, comparing data, making the necessary decisions required to control the operation of the door lock system 34 and the double door lock feature 36, and executing the required tasks necessary to control the operation of the door lock system 34 and the double door lock feature 36.

The vehicle lock controller 38 includes a tangible non-transitory memory having computer executable instructions recorded thereon, including a lock control module. The vehicle lock controller 38 further includes a processor that is operable to execute the lock control module to perform the steps of the method described below. The lock control module uses the data from the vehicle 20 sensor(s) and/or switches to determine the position and/or state of the door 24, the door lock system 34, and if so equipped, the state of the double door lock feature 36.

The vehicle lock controller 38 may be embodied as one or multiple digital computers or host machines each having one or more processors, read only memory (ROM), random access memory (RAM), electrically-programmable read only memory (EPROM), optical drives, magnetic drives, etc., a high-speed clock, analog-to-digital (A/D) circuitry, digital-to-analog (D/A) circuitry, and any required input/output (I/O) circuitry, I/O devices, and communication interfaces, as well as signal conditioning and buffer electronics.

The computer-readable memory may include any non-transitory/tangible medium which participates in providing data or computer-readable instructions. Memory may be non-volatile or volatile. Non-volatile media may include, for example, optical or magnetic disks and other persistent memory. Example volatile media may include dynamic random access memory (DRAM), which may constitute a main memory. Other examples of embodiments for memory include a floppy, flexible disk, or hard disk, magnetic tape or other magnetic medium, a CD-ROM, DVD, and/or any other optical medium, as well as other possible memory devices such as flash memory.

The vehicle 20 may further include an audio and/or video device 44 coupled to the vehicle lock controller 38. The audio and/or video device 44 is operable to communicate a message to an occupant of the vehicle 20, through either audio or video outputs. For example, the audio and/or video device 44 may include, but is not limited to, speakers, a video screen, or a combination of both. The audio and/or video device 44 is in electronic communication with the vehicle lock controller 38, which provides the output signal for the audio and/or video device 44.

The vehicle lock controller 38 may further be coupled to an onboard communication device 46. The onboard communication device 46 is operable to contact a remote service provider, when activated. For example, the onboard communication device 46 may include a cellular or digital device capable of calling and/or sending an electronic communication to a designated service provider. The onboard communication device 46 may be activated by the vehicle lock controller 38 to contact the service provider located remote from the vehicle 20, to request assistance.

The vehicle 20 may further be equipped with an alarm system 48. The alarm system 48 is operable to emit an alert to signal a potential break-in of the vehicle 20. The alarm system 48 may include any style and/or type of alarm suitable for use in the vehicle 20, and as known in the art. Typically, when activated, the alarm system 48 provides an auditory and visual alarm to draw attention to the vehicle 20.

Additionally, the alarm system 48 may be remotely connected to a service provider to alert the remote service provider.

Figure 2:
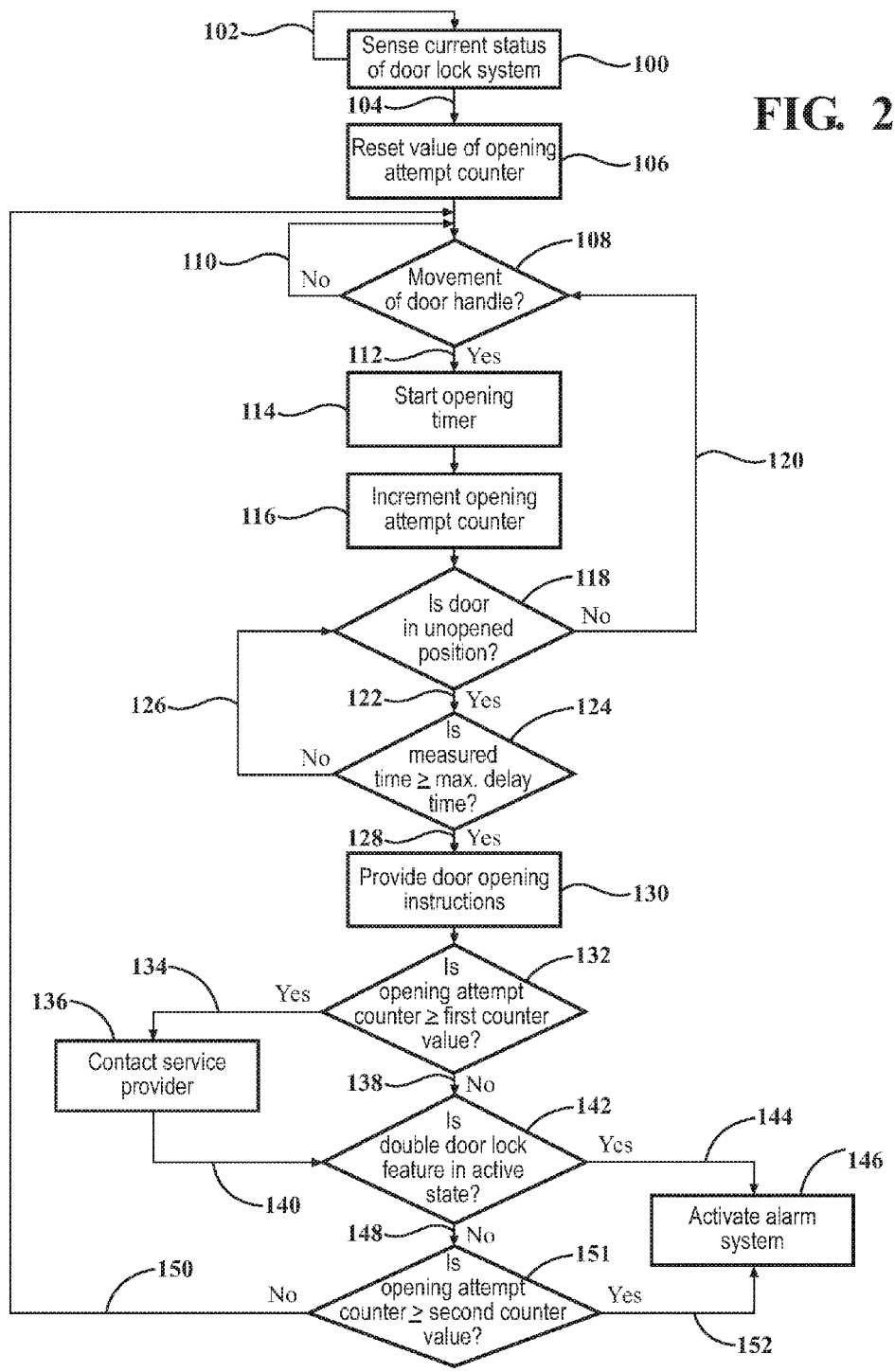
FIG. 2 is a flowchart representing a method of controlling the vehicle.

Referring to FIG. 2, a method of controlling the vehicle 20, and more specifically a method of controlling the door lock system 34 of the vehicle 20, is generally described. The method includes sensing a current status of the door lock system 34, generally indicated by box 100. The current status of the door lock system 34 is sensed to determine if the door lock system 34 is disposed in the locked state, or if the door lock system 34 is disposed in the unlocked state. The vehicle lock controller 38 may sense the status of the door lock system 34 in any suitable manner. For example, the vehicle 20 controller may sense and/or determine the status of the door lock system 34 based on data received from the lock switch 40. However, it should be appreciated that the vehicle lock controller 38 may use some other sensor capable sensing the position and/or status of the door lock system 34 to determine the current status of the door lock system 34.

If the vehicle lock controller 38 determines that the door lock system 34 is currently disposed in the unlocked state, generally indicated at 102, then no action is taken other than to continue monitoring and sensing the status of the door lock system 34. When the vehicle lock controller 38 determines that the status of the door lock system 34 changes from the unlocked state to the locked state, generally indicated at 104, then the vehicle lock controller 38 resets a value of an opening attempt counter, generally indicated by box 106. The value of the opening attempt counter is reset to equal zero when the vehicle lock controller 38 determines that the current status of the door lock system 34 has changed from the unlocked state to the locked state. The opening attempt counter is preferably integrated into the vehicle lock controller 38, and is operable to count the number of occurrences that the interior door handle 30 is actuated, as is described in greater detail below. The opening attempt counter may include any device capable of tracking and storing in the memory of the vehicle lock controller 38 the number of occurrences that the interior door handle 30 is actuated.

Once the opening attempt counter is reset to zero, then the vehicle lock controller 38 senses any movement or actuation of the interior door handle 30 of the vehicle 20, generally indicated by box 108. Movement of the interior door handle 30 is sensed to determine if an occupant of the interior of the vehicle 20 is attempting to open the door 24 of the vehicle 20 from within the interior of the vehicle 20. The vehicle lock controller 38 may sense movement of the interior door handle 30 in any suitable manner. For example, the vehicle lock controller 38 may sense and/or determine movement of the interior door handle 30 based on data received from a sensing device. The sensing device may include, for example, the lock switch 40. Alternatively, the sensing device may include a sensing switch directly coupled to the door handle 32. However, it should be appreciated that the vehicle lock controller 38 may use some other sensor capable sensing movement of the interior door handle 30.

If the vehicle lock controller 38 does not sense or otherwise determine any movement of the interior door handle 30, generally indicated at 110, then no action is taken other than to continue sensing for any movement of the interior door handle 30. When the vehicle lock controller 38 determines that the interior door handle 30 has moved, i.e., movement is sensed, generally indicated at 112, then the vehicle lock controller 38 resets an opening timer to a time of zero, and then starts the opening timer to measure an elapsed time period since movement of the interior door handle 30 was sensed, generally indicated by box 114. The opening timer is preferably integrated into the vehicle lock controller 38, and is operable to measure time. The opening timer may include any device capable of measuring time, such as an electronic clock, and storing in the memory of the vehicle lock controller 38 the elapsed period of time since the movement of the interior door handle 30 was sensed. It should be appreciated that the opening timer measures the period of time continuously until stopped and reset to a value of zero.

In addition to resetting and starting the opening timer when the vehicle lock controller 38 detects or senses movement of the interior door handle 30, the vehicle lock controller 38 also increments the value of the opening attempt counter by one for each occurrence of a sensed movement of the interior door handle 30, generally indicated by box 116. Accordingly, each time that the vehicle lock controller 38 senses that the interior door handle 30 has been actuated, the value of the opening attempt counter is increased by a value of one. For example, the first time that the vehicle lock controller 38 senses movement of the interior door handle 30, the value of the opening attempt counter is increased from a value of zero to a value of one. The second time the vehicle lock controller 38 senses movement of the interior door handle 30, the value of the opening attempt counter is increased from a value of one to a value of two. This process continues every time that the vehicle lock controller 38 senses movement of the interior door handle 30, until the value of the opening attempt counter is reset to zero.

After movement of the interior door handle 30 is sensed, the vehicle lock controller 38 continuously monitors the door 24 to sense and/or determine a position of the door 24, generally indicated by box 118. The vehicle lock controller 38 senses the position of the door 24 to determine if the door 24 remains in an unopened position after movement of the interior door handle 30 is sensed, or if the door 24 moves into an opened position after movement of the interior door handle 30 is sensed. The vehicle lock controller 38 may sense the position of the door 24 in any suitable manner. For example, the vehicle 20 controller may sense and/or determine the position of the door 24 based on data received from the door position sensor 42. However, it should be appreciated that the vehicle lock controller 38 may use some other sensor capable sensing the position and/or status of the door 24 to determine the current position and/or change in position of the door 24.

If the vehicle lock controller 38 senses or determines that the position of the door 24 has moved from the unopened position into the opened position after movement of the interior door handle 30, generally indicated at 120, then the vehicle lock controller 38 returns to continue to monitor or sense for actuation or movement of the interior door handle 30, generally indicated by box 108. If the vehicle lock controller 38 senses or determines that the position of the door 24 has not changed, and that the door 24 remains in the unopened position after movement of the interior door handle 30 is sensed, generally indicated at 122, then the vehicle lock controller 38 compares the measured time period to a maximum delay time, generally indicated by box 124. The measured time period is compared to the maximum delay time to determine if the measured time period is equal to or greater than the maximum delay time, or if the measured time period is less than the maximum delay time. The maximum delay time is a pre-defined period of time allotted to allow an occupant of the vehicle 20 to move the door 24 from the unopened position into the opened position. It may be assumed that if an occupant fails to move the door 24 from the unopened position into the opened position within the maximum delay time, and after actuating the interior door handle 30, that the occupant is for some reason unable to open the door 24.

If the vehicle lock controller 38 determines that the current measured time, measured by the opening timer, is less than the maximum delay time, generally indicated at 126, then the vehicle lock controller 38 continues to monitor or sense movement of the door 24 to determine if the door 24 remains in the unopened position, or is moved into the opened position, generally indicated by box 118. However, if the vehicle lock controller 38 determines that the current measured time, measured by the opening timer, is equal to or greater than the maximum delay time, generally indicated at 128, and the door 24 has not been moved into the opened position, then the vehicle lock controller 38 provides instructions related to the proper procedure for unlocking and/or opening the door 24, generally indicated by box 130. The instructions may be provided to the occupant through or by any suitable device, such as an audio device, video device, or a combination of audio and/or video devices 44. For example, the vehicle lock controller 38 may provide audio instructions to the occupant on the proper procedure for unlocking and opening the door 24 from the interior of the vehicle 20 through the vehicles 20 radio system, or other system speakers. Alternatively, if the vehicle 20 is equipped with a video display/control center, then the vehicle lock controller 38 may display the proper instructions for the occupant.

Once the vehicle lock controller 38 has provided the instructions on how to properly unlock and/or open the door 24 from within the vehicle 20, generally indicated by box 130, then the vehicle lock controller 38 may compare the value of the opening attempt counter to an assistance counter value, generally indicated by box 132. The assistance counter value is hereinafter referred to as the first counter value. The value of the opening attempt counter is compared to the first counter value to determine if the value of the opening attempt counter is equal to or greater than the first counter value, or if the value of the opening attempt counter is less than the first counter value. As noted above, the opening attempt counter is incremented by one every time that the interior door handle 30 is actuated, i.e., moved. The first counter value is a pre-defined value allotting a number of attempts an occupant may make to open the door 24 unsuccessfully, before the vehicle lock controller 38 signals for assistance.

If the vehicle lock controller 38 determines that the value of the opening attempt counter is equal to or greater than the first counter value, generally indicated at 134, then the vehicle lock controller 38 automatically contacts a service provider, generally indicated by box 136. The vehicle lock controller 38 may contact the remote service provider with the onboard communication device 46 of the vehicle 20, to request assistance in opening or unlocking door 24 of the vehicle 20. For example, the vehicle lock controller 38 may contact a remote service provider and request that an emergency vehicle 20 be directed to the current location of the vehicle 20 to assist the occupant in exiting the vehicle 20. Alternatively, after initiating contact with the remote service provider such that the remote service provider may verify the identity of the occupant, the remote service provider may signal the vehicle lock controller 38 from a remote location to move the door lock system 34 from the locked state into the unlocked state, to allow the occupant to open the door 24.

If the vehicle lock controller 38 determines that the value of the opening attempt counter is less than the first counter value, generally indicated at 138, or after the vehicle lock controller 38 has automatically contacted the remote service provider, generally indicated at 140, and if the door lock system 34 is equipped with a double door lock feature 36, then the vehicle lock controller 38 senses and/or determines a current operating state of the double door lock feature 36, generally indicated by box 142. The current state of the double door lock feature 36 is sensed to determine if the double door lock feature 36 is disposed in an active state, or if the double door lock feature 36 is disposed in an inactive state. As described above, if the door lock system 34 is equipped with the double door lock feature 36, and the double door lock feature 36 is active, then the double door lock feature 36 may only be inactivated by a signal from the remote keyless entry device and/or the vehicle lock controller 38.

If the vehicle lock controller 38 determines that the double door lock feature 36 is active, generally indicated at 144, then the vehicle lock controller 38 may activate the alarm system 48 of the vehicle 20 to signal an alert, generally indicated by box 146. If the vehicle lock controller 38 determines that the double door lock feature 36 is inactive, generally indicated at 148, then the vehicle lock controller 38 compares the value of the opening attempt counter to an alarm counter value, generally indicated by box 151. The alarm counter value is hereinafter referred to as the second counter value. The value of the opening attempt counter is compared to the second counter value to determine if the value of the opening attempt counter is equal to or greater than the second counter value, or if the value of the opening attempt counter is less than the second counter value. As noted above, the opening attempt counter is incremented by one every time that the interior door handle 30 is actuated, i.e., moved. The second counter value is a pre-defined value allotting a number of attempts an occupant may make to open the door 24 unsuccessfully, before the vehicle lock controller 38 activates the alarm system 48.

If the vehicle lock controller 38 determines that the double door lock feature 36 is inactive, and that the value of the opening attempt counter is less than the second counter value, generally indicated at 150, then the vehicle lock controller 38 continues to monitor and/or sense for movement or actuation of the interior door handle 30, generally indicated by box 108. However, if the vehicle lock controller 38 determines that the double door lock feature 36 is inactive, and the value of the opening attempt counter is equal to or greater than the second counter value, generally indicated at 152, then the vehicle lock controller 38 may activate the alarm system 48 of the vehicle 20 to signal an alert, generally indicated by box 146.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A method of controlling a vehicle, the method comprising:
sensing movement of an interior door handle of the vehicle with a sensing device;
sensing a position of a door of the vehicle with a door position sensor after movement of the interior door handle is sensed, to determine if the door remains in an unopened position after movement of the interior door handle is sensed, or if the door moves into an opened position after movement of the interior door handle is sensed;

sensing a current status of a door lock system with a lock switch to determine if the door lock system is disposed in a locked state or if the door lock system is disposed in an unlocked state, wherein sensing the current status of the door lock system includes sensing a state of a double door lock feature of the door lock system to determine if the double door lock feature is disposed in an active state, or if the double door lock feature is disposed in an inactive state;

providing instructions with an audio or video device related to a proper procedure for unlocking and opening the door, when movement of the interior door handle is sensed and the door remains in the unopened position after movement of the interior door handle; and comparing a value of an opening attempt counter to an alarm counter value, with a vehicle lock controller, to determine if the value of the opening attempt counter is equal to or greater than the alarm counter value, or if the value of the opening attempt counter is less than the alarm counter value.

2. The method set forth in claim 1 further comprising resetting the value of the opening attempt counter equal to zero when the door lock system is disposed in the locked state.

3. The method set forth in claim 1 further comprising starting an opening timer to measure a time period when movement of the interior door handle is sensed.

4. The method set forth in claim 3 further comprising comparing the measured time period to a maximum delay time, with a vehicle lock controller, when the door remains in the unopened position after movement of the interior door handle is sensed, to determine if the measured time period is equal to or greater than the maximum delay time, or if the measured time period is less than the maximum delay time.

5. The method set forth in claim 4 wherein providing instructions with the audio or video device is further defined as providing instructions with the audio or video device when the measured time period is equal to or greater than the maximum time delay.

6. The method set forth in claim 1 further comprising incrementing the value of the opening attempt counter by one for each occurrence of a sensed movement of the interior door handle.

7. The method set forth in claim 6 further comprising comparing the value of the opening attempt counter to an assistance counter value, with the vehicle lock controller, to determine if the value of the opening attempt counter is equal to or greater than the assistance counter value, or if the value of the opening attempt counter is less than the assistance counter value.

8. The method set forth in claim 7 further comprising automatically contacting a service provider, with an onboard communication device of the vehicle, to request assistance in opening or unlocking the door of the vehicle, when the value of the opening attempt counter is equal to or greater than the assistance counter value.

9. The method set forth in claim 1 further comprising activating an alarm system of the vehicle to signal an alert when the double door lock system is disposed in the active state.

10. The method set forth in claim 1 further comprising activating an alarm system of the vehicle to signal an alert when the double door lock system is disposed in the inactive state, and the value of the opening attempt counter is equal to or greater than the alarm counter value.

11. A method of controlling a door lock system of a vehicle, the method comprising:

sensing a current status of the door lock system with a lock switch to determine if the door lock system is disposed in a locked state or if the door lock system is disposed in an unlocked state, wherein sensing the current status of the door lock system includes sensing a state of a double door lock feature of the door lock system to determine if the double door lock feature is disposed in an active state, or if the double door lock feature is disposed in an inactive state;

sensing movement of an interior door handle of the door with a sensing device;

starting an opening timer to measure a time period after movement of the interior door handle is sensed;

incrementing a value of an opening attempt counter by one for each occurrence of a sensed movement of the interior door handle;

sensing a position of the door of the vehicle with a door position sensor after movement of the interior door handle is sensed, to determine if the door remains in an unopened position after movement of the interior door handle is sensed, or if the door moves into an opened position after movement of the interior door handle is sensed;

comparing the measured time period to a maximum delay time, with a vehicle lock controller, when the door remains in the unopened position after movement of the interior door handle is sensed, to determine if the measured time period is equal to or greater than the maximum delay time, or if the measured time period is less than the maximum delay time;

providing instructions with an audio or video device related to a proper procedure for unlocking and opening the door, when movement of the interior door handle is sensed, the door remains in the unopened position after movement of the interior door handle, and the measured time period is equal to or greater than the maximum delay time automatically contacting a service provider, with an onboard communication device of the vehicle, to request assistance in opening or unlocking the door of the vehicle, when the value of the opening attempt counter is equal to or greater than an assistance counter value; and activating an alarm system of the vehicle to signal an alert when the double door lock system is disposed in the inactive state, and the value of the opening attempt counter is equal to or greater than an alarm counter value.

12. The method set forth in claim 11 further comprising moving the door lock system from the locked state to the unlocked state, with the vehicle lock controller, in response to a signal remotely sent from the service provider.

13. The method set forth in claim 11 further comprising activating an alarm system of the vehicle to signal an alert when the double door lock system is disposed in the active state.

14. A method of controlling a vehicle, the method comprising:

sensing movement of an interior door handle of the vehicle with a sensing device;

incrementing a value of an opening attempt counter by one for each occurrence of a sensed movement of the interior door handle;

sensing a state of a double door lock feature of a door lock system to determine if the double door lock feature is disposed in an active state, or if the double door lock feature is disposed in an inactive state;

comparing the value of the opening attempt counter to an assistance counter value to determine if the value of the opening attempt counter is equal to or greater than the assistance counter value, or if the value of the opening attempt counter is less than the assistance counter value;

automatically contacting a service provider to request assistance in opening or unlocking the door of the vehicle, when the value of the opening attempt counter is equal to or greater than the assistance counter value;

comparing the value of the opening attempt counter to an alarm counter value to determine if the value of the opening attempt counter is equal to or greater than the alarm counter value, or if the value of the opening attempt counter is less than the alarm counter value; and activating an alarm system of the vehicle to signal an alert when the double door lock system is disposed in the inactive state, and the value of the opening attempt counter is equal to or greater than the alarm counter value.

15. The method set forth in claim 14 further comprising sensing a position of the door of the vehicle with a door position sensor after movement of the interior door handle is sensed, to determine if the door remains in an unopened position after movement of the interior door handle is sensed, or if the door moves into an opened position after movement of the interior door handle is sensed.

16. The method set forth in claim 15 further comprising providing instructions with an audio or video device related to a proper procedure for unlocking and opening the door, when movement of the interior door handle is sensed and the door remains in the unopened position after movement of the interior door handle.

17. The method set forth in claim 14 further comprising sensing a current status of the door lock system with a lock switch to determine if the door lock system is disposed in a locked state or if the door lock system is disposed in an unlocked state.

18. The method set forth in claim 17 further comprising resetting the value of the opening attempt counter equal to zero when the door lock system is disposed in the locked state.

* * * * *